(12) United States Patent
Kaneko

(10) Patent No.: US 9,440,833 B2
(45) Date of Patent: Sep. 13, 2016

(54) ENGINE-POWERED FORKLIFT TRUCK AND METHOD OF RELEASING LOAD HANDLING INTERLOCK THEREOF

(75) Inventor: Shinji Kaneko, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/701,033

(22) PCT Filed: Apr. 23, 2012

(86) PCT No.: PCT/JP2012/060835
§ 371 (c)(1),
(2), (4) Date: Nov. 30, 2012

(87) PCT Pub. No.: WO2013/160984
PCT Pub. Date: Oct. 31, 2013

(65) Prior Publication Data
US 2015/0034424 A1 Feb. 5, 2015

(51) Int. Cl.
*B66F 9/22* (2006.01)
*B66F 9/24* (2006.01)
*B66F 17/00* (2006.01)
*B60K 28/04* (2006.01)
*F02D 41/02* (2006.01)
*F02D 29/04* (2006.01)

(52) U.S. Cl.
CPC ............. *B66F 17/003* (2013.01); *B66F 9/22* (2013.01); *B66F 9/24* (2013.01); *B60K 28/04* (2013.01); *F02D 29/04* (2013.01); *F02D 41/021* (2013.01)

(58) Field of Classification Search
CPC ........ B66F 9/0759; B66F 9/205; B66F 9/22; B66F 9/24; B66F 17/003; F02D 29/04; F02D 41/021; F02D 31/008; F02D 31/009; B60K 28/04
See application file for complete search history.

(56) References Cited

U.S. PATENT DOCUMENTS

| | | | | | |
|---|---|---|---|---|---|
| 2,911,053 | A | * | 11/1959 | Ayers et al. | 180/273 |
| 4,485,623 | A | * | 12/1984 | Chichester et al. | 60/422 |
| 4,511,974 | A | * | 4/1985 | Nakane et al. | 701/124 |

(Continued)

FOREIGN PATENT DOCUMENTS

| | | |
|---|---|---|
| CN | 101990505 A | 3/2011 |
| JP | 61-221097 A | 10/1986 |

(Continued)

OTHER PUBLICATIONS

International Search Report dated Jul. 24, 2012, issued for PCT/JP2012/060835.

(Continued)

*Primary Examiner* — William A Rivera
*Assistant Examiner* — Stefan Kruer
(74) *Attorney, Agent, or Firm* — Locke Lord LLP; James E. Armstrong, IV; Brian S. Matross

(57) ABSTRACT

An engine-powered forklift truck including a work device which is hydraulically driven by an oil hydraulic pump whose driving source is an engine, and including a load handling interlock mechanism which brings a work device operation into a locked state by turning a key switch off or turning a seat switch off, includes: a release control apparatus configured to, when the locked state exists, release the locked state on condition that the key switch is ON, the seat switch is ON, and the engine is rotated under a predetermined engine speed or more.

5 Claims, 4 Drawing Sheets

(56) References Cited

U.S. PATENT DOCUMENTS

| | | | |
|---|---|---|---|
| 4,942,529 A * | 7/1990 | Avitan et al. | 701/50 |
| 5,109,945 A | 5/1992 | Koga | |
| 5,995,001 A * | 11/1999 | Wellman et al. | 340/438 |
| 6,030,169 A * | 2/2000 | Rossow | B60K 28/04 180/273 |
| 6,135,694 A * | 10/2000 | Trego et al. | 414/21 |
| 6,277,050 B1 * | 8/2001 | Nakagawa et al. | 477/112 |
| 6,611,746 B1 * | 8/2003 | Nagai | 701/50 |
| 8,397,843 B2 * | 3/2013 | Tsumiyama | F02D 41/021 180/290 |
| 2001/0030085 A1 * | 10/2001 | Nagata et al. | 187/222 |
| 2003/0167114 A1 * | 9/2003 | Chen | 701/50 |
| 2004/0026150 A1 * | 2/2004 | Nishi | B60K 28/04 180/272 |
| 2004/0099233 A1 * | 5/2004 | Fujimoto | F02D 41/06 123/142.5 |
| 2004/0249538 A1 * | 12/2004 | Osaki et al. | 701/50 |
| 2006/0071541 A1 * | 4/2006 | Berg | B60K 28/04 303/89 |
| 2006/0254847 A1 * | 11/2006 | Miura et al. | 180/273 |
| 2006/0260877 A1 * | 11/2006 | Ito et al. | 187/224 |
| 2009/0152052 A1 * | 6/2009 | Schoettke | 187/223 |
| 2010/0114464 A1 * | 5/2010 | Miller | B60K 28/04 701/113 |
| 2011/0093150 A1 | 4/2011 | Yanagisawa et al. | |
| 2012/0323464 A1 * | 12/2012 | Steen | F02D 41/02 701/103 |
| 2013/0089399 A1 | 4/2013 | Kaneko et al. | |

FOREIGN PATENT DOCUMENTS

| | | |
|---|---|---|
| JP | 2006-316942 A | 11/2006 |
| JP | 2007-055754 A | 3/2007 |
| JP | 4665665 B2 | 3/2007 |
| JP | 2009-019660 A | 1/2009 |
| JP | 2012-052457 A | 3/2012 |
| JP | 5226157 B1 * | 7/2013 ................ B66F 9/24 |

OTHER PUBLICATIONS

German Office Action mailed in corresponding Application No. 11 2012 000 032.3 dated Jul. 22, 2014 with English translation.

* cited by examiner

ENGINE-POWERED FORKLIFT TRUCK AND METHOD OF RELEASING LOAD HANDLING INTERLOCK THEREOF

FIELD

The present invention relates to an engine-powered forklift truck including a work device which is hydraulically driven by an oil hydraulic pump whose driving source is an engine, and including a load handling interlock mechanism which brings a work device operation into a locked state by turning a key switch off or turning a seat switch off, and a method of releasing a load handling interlock thereof.

BACKGROUND

A working machine, such as a forklift truck, is provided with a load handling interlock mechanism which includes a seat switch which detects whether an operator has left the seat, or not. When the seat switch detects a seat leaving (OFF), or the key switch is brought into OFF, the load handling interlock mechanism brings a work device, such as a fork, which is hydraulically driven, into a locked state (refer to Japanese Laid-open Patent Publication No. 2009-19660).

This conventional load handling interlock mechanism is configured such that the locked state of the work device is released when the key switch is ON, and the seat switch is ON (detection of seating). The load handling interlock is configured to be able to be released under such a releasing condition because, even when the engine is stopped due to a malfunction of the working machine or a fuel shortage and the like, the work device can be moved by operating the work operation lever so that the working machine can be safely brought down.

On the other hand, some ordinary vehicle is provided with an auto idle stop mechanism which automatically brings the idle rotation state of the engine into the stop state when a predetermined time elapses after the above-mentioned seat switch is brought into OFF.

SUMMARY

Technical Problem

Here, such a case is examined that the auto idle stop function is provided to the forklift truck, like the ordinary vehicle. In this case, when the operator leaves the seat under a state in which the key switch is kept in the ON state, the seat switch is brought into OFF so that the load handling interlock mechanism becomes the locked state. Then, the seat switch is brought into OFF so that the above-mentioned auto idle stop mechanism is operated so as to stop the engine. In this case, another operator may not notice the fact that the engine of the forklift truck is stopped by the auto idle stop mechanism, and therefore, another operator may erroneously think that the key switch is made OFF. Then, when the concerned another operator takes a seat so as to bring the seat switch into ON, the locked state of the load handling interlock mechanism is released because the key switch is kept to be the ON state. In such a case, when another operator moves the work device operation lever, the work device is brought into motion because the locked state of the load handling interlock mechanism is released. For example, regardless of the intention of the operator, an unexpected operation of the work device may be caused, such as descending of the fork.

This invention has been made taking into account the above-mentioned situations, and its object is to provide an engine-powered forklift truck which can release a locked state of a load handling interlock while preventing a work device operation which does not correspond to an intention of an operator, and a method of releasing the load handling interlock thereof.

Solution to Problem

To achieve the object mentioned above, according to the present invention, an engine-powered forklift truck including a work device which is hydraulically driven by an oil hydraulic pump whose driving source is an engine, and including a load handling interlock mechanism which brings a work device operation into a locked state by turning a key switch off or turning a seat switch off, comprises: a release control apparatus configured to, when the locked state exists, release the locked state on condition that the key switch is ON, the seat switch is ON, and the engine is rotated under a predetermined engine speed or more.

According to the present invention, the release control apparatus determines, when the locked state exists, whether the key switch is ON, and the engine is under a stop state, and when the key switch is ON, and the engine is under the stop state, releases the locked state on condition that the key switch is ON, the seat switch is ON, and the engine is rotated under the predetermined engine speed or more, and when the key switch is ON, and the engine is not under the stop state, releases the locked state on condition that the key switch is ON, and the seat switch is ON.

According to the present invention, the engine-powered forklift truck further comprises an idle stop mechanism which brings the engine into the stop state after a predetermined time elapses after the seat switch is brought into OFF, wherein the release control apparatus releases the locked state, when the locked state exists, or when the locked state exists, the key switch is ON, and the engine is under the stop state, on condition that the key switch is ON, the seat switch is ON, and the engine is rotated under the predetermined engine speed or more.

According to the present invention, a load handling interlock release method for an engine-powered forklift truck including a work device which is hydraulically driven by an oil hydraulic pump whose driving source is an engine, and including a load handling interlock mechanism which brings a work device operation into a locked state by turning a key switch off or turning a seat switch off, wherein, when the locked state exists, the locked state is released on condition that the key switch is ON, the seat switch is ON, and the engine is rotated under a predetermined engine speed or more.

According to the present invention, the load handling interlock release method for the engine-powered forklift truck further comprises: determining, when the locked state exists, whether the key switch is ON, and the engine is under a stop state; releasing the locked state, when the key switch is ON, and the engine is under the stop state, on condition that the key switch is ON, the seat switch is ON, and the engine is rotated under the predetermined engine speed or more; and releasing the locked state, when the key switch is ON, and the engine is not under the stop state, on condition that the key switch is ON, and the seat switch is ON.

Advantageous Effects of Invention

According to this invention, when the load handling interlock mechanism is under the. locked state, the locked state is released on condition that the key switch is ON, the seat switch is ON, and the engine is rotated under a predetermined engine speed or more so as to prevent a work device operation which does not correspond to an intention of an operator.

DESCRIPTION OF EMBODIMENTS

An embodiment of this invention will be described with reference to the attached drawings hereunder.

Figure 1:
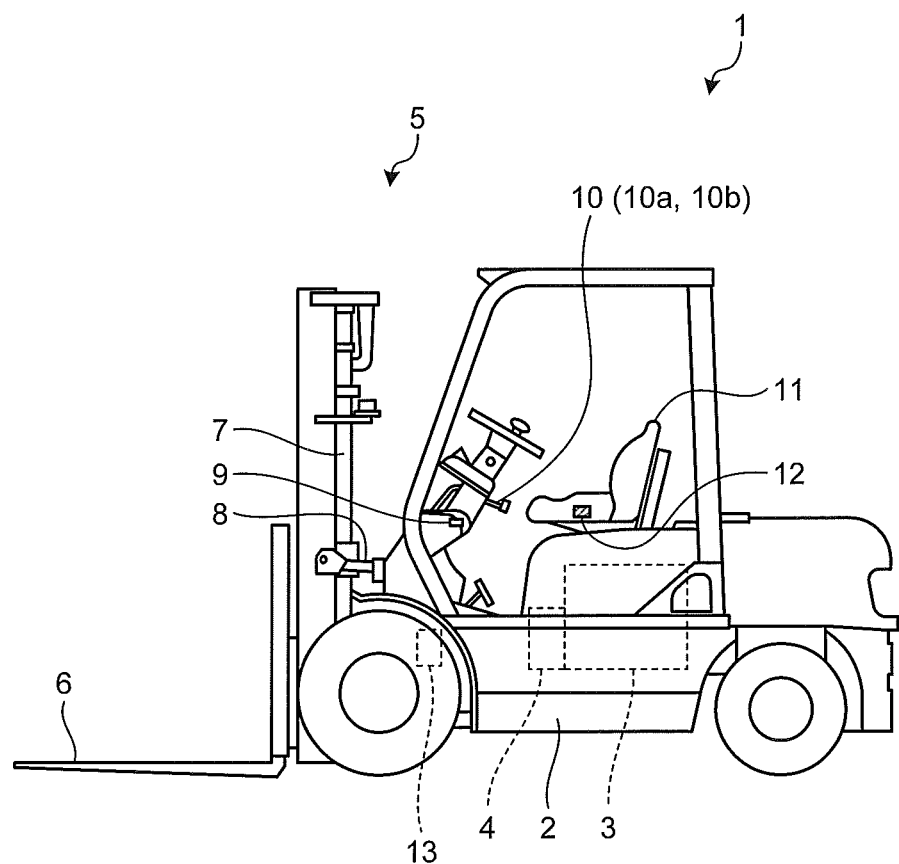
FIG. 1 is a drawing illustrating an overall constitution of an engine-powered forklift truck.
Figure 2:
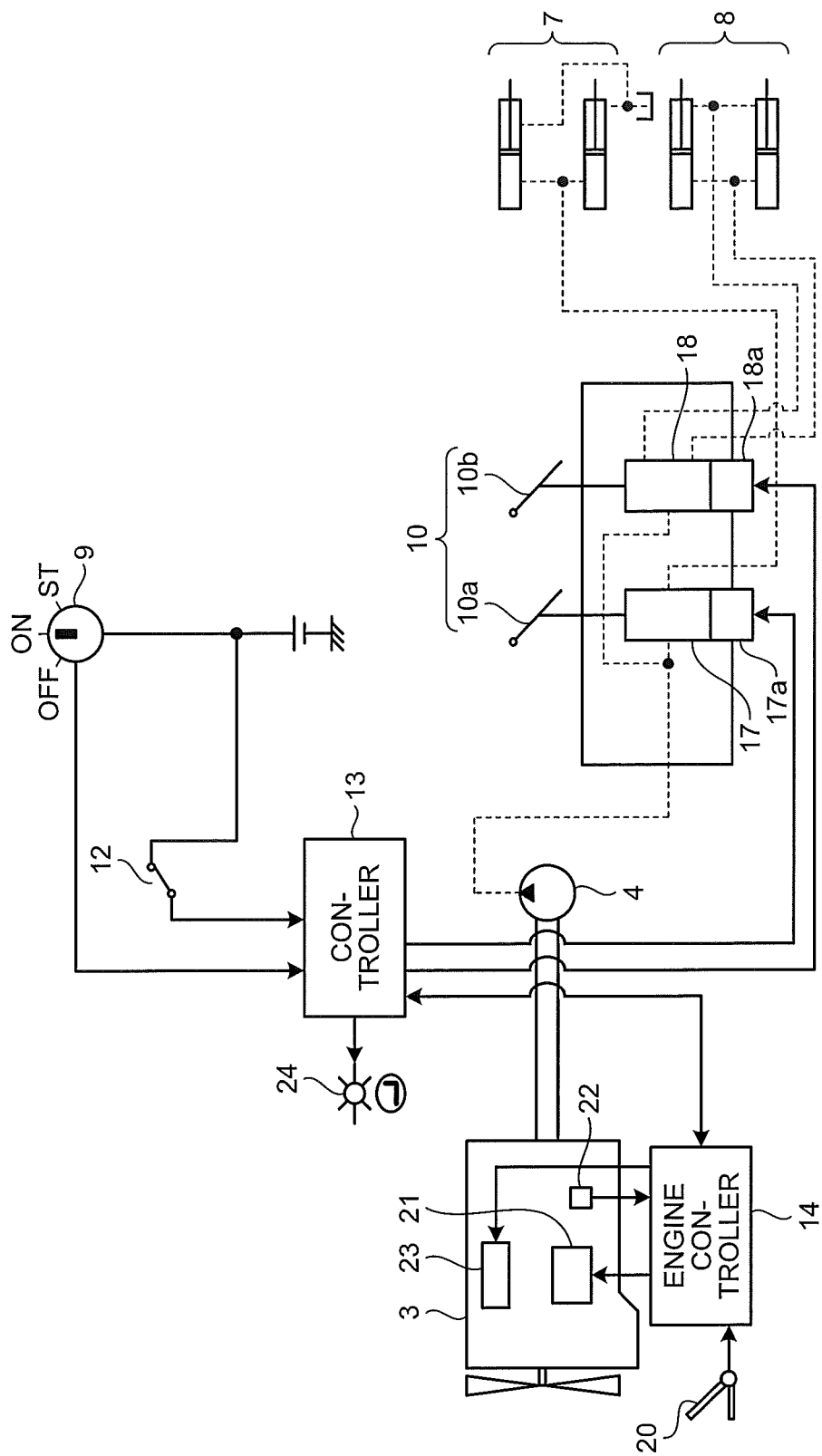
FIG. 2 is a block diagram illustrating a circuit constitution of the engine-powered forklift truck which includes a load handling interlock mechanism illustrated in FIG. 1.

FIG. 1 is a drawing illustrating a whole constitution of an engine-powered forklift truck. Moreover, FIG. 2 is a block diagram illustrating a circuit constitution of the engine-powered forklift truck which includes a load handling interlock mechanism illustrated in FIG. 1. In FIG. 1, an engine-powered forklift truck 1 is provided with a work device 5 on a car body 2 which includes four wheels. The car body 2 is provided with an engine 3, and a work device pump 4 which is an oil hydraulic pump whose driving source is the engine 3. Note that, the wheels are driven to run by a hydrostatic transmission (HST) which is configured such that the oil hydraulic pump (not illustrated) whose driving source is the engine 3 and an oil hydraulic motor are communicated with each other by means of a closed circuit so as to run with a power of the oil hydraulic motor.

The work device 5 includes a lift cylinder 7 which drives a fork 6 so as to ascend and descend, and a tilt cylinder 8 which drives the fork 6 so as to tilt. A driver's seat of the car body 2 is provided with a key switch 9, work device operation levers 10 (10a, 10b) for operating and driving the fork, and a seat switch 12 which is disposed on the seat portion of a seat 11 so as to detect seating and leaving of an operator.

As illustrated in FIG. 2, the engine 3 drives the work device pump 4. The work device pump 4 supplies hydraulic oil to the lift cylinder 7 via a lift operation valve 17, and to the tilt cylinder 8 via a tilt operation valve 18. Here, the lift operation valve 17 is operated in accordance with an operation amount of the lift lever 10a of the work device operation levers 10 so that an amount of the hydraulic oil supplied to the lift cylinder 7 is adjusted so as to drive the lift cylinder 7. Moreover, the tilt operation valve 18 is operated in accordance with an operation amount of the tilt lever 10b of the work device operation levers 10 so that an amount of the hydraulic oil supplied to the tilt cylinder 8 is adjusted so as to drive the tilt cylinder 8.

Moreover, the lift operation valve 17 and the tilt operation valve 18 are respectively provided with a lift lock solenoid 17a and a tilt lock solenoid 18a. The respective lift lock solenoid 17a and the tilt lock solenoid 18a are controlled by a controller 13 so as to lock and unlock of operations of the lift operation valve 17 and the tilt operation valve 18, respectively.

An engine controller 14 is connected to the controller 13 by means of CAN communication and the like. The engine controller 14 obtains a detection result of a group of sensors 22 which detect an engine speed of the engine 3 and the like, and controls a fuel supply pump 21 in accordance with an operation amount of an accelerator pedal 20 so that a fuel injection quantity is adjusted so as to control the engine speed of the engine and the torque of the engine.

The key switch 9 is connected to the controller 13. The key switch 9 is connected to a battery so as to select an OFF state (OFF), an ON state (ON), and a start state (ST). The flow of electric current is shut off with respect to the battery under the OFF state, and is allowed to flow with respect to the battery under the ON state. Moreover, at the start position, the flow of electric current with respect to the battery is maintained, and a starter 23 is activated via the engine controller 14 so as to start the engine 3.

The seat switch 12 is connected to the controller 13, and can be supplied with electric power from the battery. When an operator takes a seat, a line from the battery to the controller 13 is brought into a state in which an electric current flows so that the controller 13 detects the ON state of the seat switch 12. On the other hand, when the operator leaves the seat 11, or a trouble of breaking of wire occurs, the line is brought into a state in which an electric current does not flow so that the controller 13 detects the OFF state of the seat switch 12, or the wire breaking state of the line.

A load handling interlock alarm lamp 24 is made of an LED and the like, and is lighted when the lift operation valve 17 and the tilt operation valve 18 are under the locked states so as to inform the states.

The controller 13 controls at least the load handling interlock mechanism and an auto idle stop mechanism. In start control of the load handling interlock mechanism, when the key switch 9 is OFF, or the seat switch 12 is OFF, the lift lock solenoid 17a and the tilt lock solenoid 18a are driven so as to provide the locked state in which the operations of the lift operation valve 17 and the tilt operation valve 18 are stopped. Moreover, in the release control of the load handling interlock mechanism, when the load handling interlock is under the locked state, the locked state is released on condition that the key switch 9 is ON, the seat switch 12 is ON, and the engine is rotated under a predetermined engine speed or more. Note that, in the control of the auto idle stop mechanism, the idle rotation state of the engine 3 is brought into the stop state when a predetermined time elapses after the seat switch 12 is brought into OFF. In this regard, the state in which the engine is rotated under the predetermined engine speed or more is defined as a state in which substantially the engine is not stopped, or the engine is rotated in such an engine speed that an autonomic rotation can be performed. Accordingly, when the engine is rotated under an engine speed which is less than the predetermined engine speed, the engine is substantially stopped, and the autonomic rotation cannot be performed by the engine. Moreover, when the engine is rotated under an engine speed which is less than the predetermined engine speed (for example, 10 rpm), the voltage for an electric power generation of an alternator is under a state of 0 V. Accordingly, it can be detected whether the engine is rotated under the predetermined engine speed or more, or not, by detecting the voltage for an electric power generation of the alternator.

Here, referring to the flowchart illustrated in FIG. 3, the steps of a load handling interlock control process by means of the controller 13 will be described. Note that, in this load handling interlock control process, it is assumed that the key switch 9 is under the ON state. Moreover, it is assumed that, when the key switch 9 is under the OFF state, this load handling interlock control process is forcibly terminated so as to bring the load handling interlock into the locked state.

Figure 3:
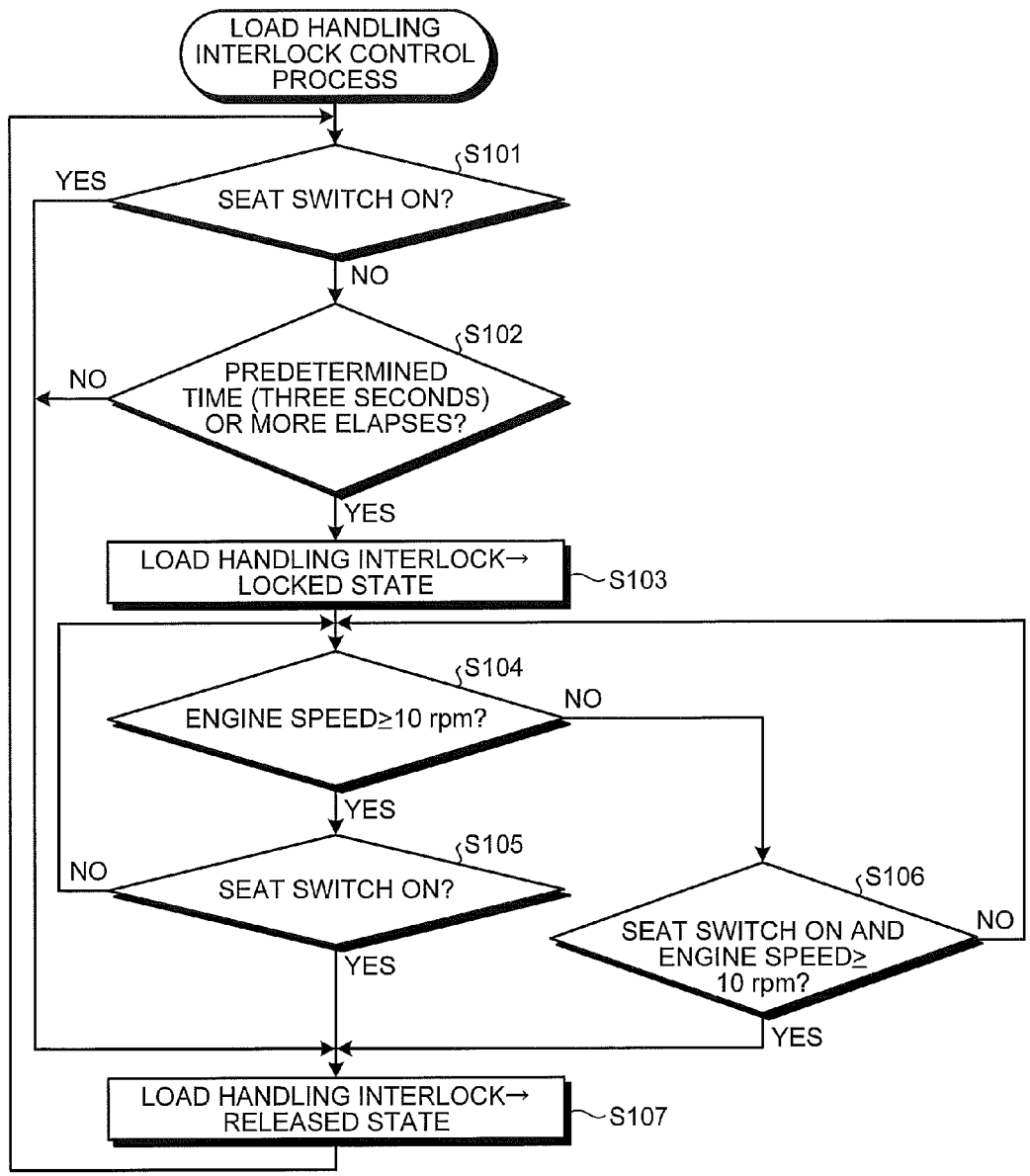
FIG. 3 is a flowchart illustrating steps of a load handling interlock control process by means of a controller.

First, as illustrated in FIG. 3, the controller 13 determines whether the seat switch 12 is ON, or not (Step S101). When the seat switch 12 is ON (Step S101, Yes), the load handling interlock is brought into the released state (Step S107).

On the other hand, when the seat switch 12 is OFF (Step S101, No), the controller 13 further determines whether a predetermined time ($\Delta ta=3$ seconds) or more elapses, or not (Step S102). When the predetermined time or more does not elapse (Step S102, No), the load handling interlock is brought into the released state (Step S107).

When the predetermined time or more elapses (Step S102, Yes), the load handling interlock is brought into the locked state (Step S103). Note that, the shifting to the locked state of the load handling interlock by the Step S103 is performed by sending instruction signals of the lock from the controller 13 to the lift lock solenoid 17a and the tilt lock solenoid 18a so as to forcibly stop the operations of the lift operation valve 17 and the tilt operation valve 18, respectively.

After that, the controller 13 determines whether the engine speed is the predetermined engine speed (10 rpm) or more, or not (Step S104). When the engine speed is the predetermined engine speed or more (Step S104, Yes), the controller 13 further determines whether the seat switch 12 is ON, or not (Step S105). When the seat switch 12 is not ON (Step S105, No), go to the Step S104, and when the seat switch 12 is ON (Step S105, Yes), the load handling interlock is brought into the released state (Step S107).

On the other hand, when the engine speed is not the predetermined engine speed or more (Step S104, No), the controller 13 further determines whether the seat switch 12 is ON and the engine speed becomes the predetermined number of revolution or more, or not (Step S106). When the seat switch 12 is ON, and the engine speed is not the predetermined engine speed or more (Step S106, No), go to the Step S104, and when the seat switch 12 is ON, and the engine speed is the predetermined engine speed or more (Step S106, Yes), the load handling interlock is brought into the released state (Step S107).

After the load handling interlock is brought into the released state in the Step S107, go to the Step S101 and repeat the above-mentioned process.

Figure 4:
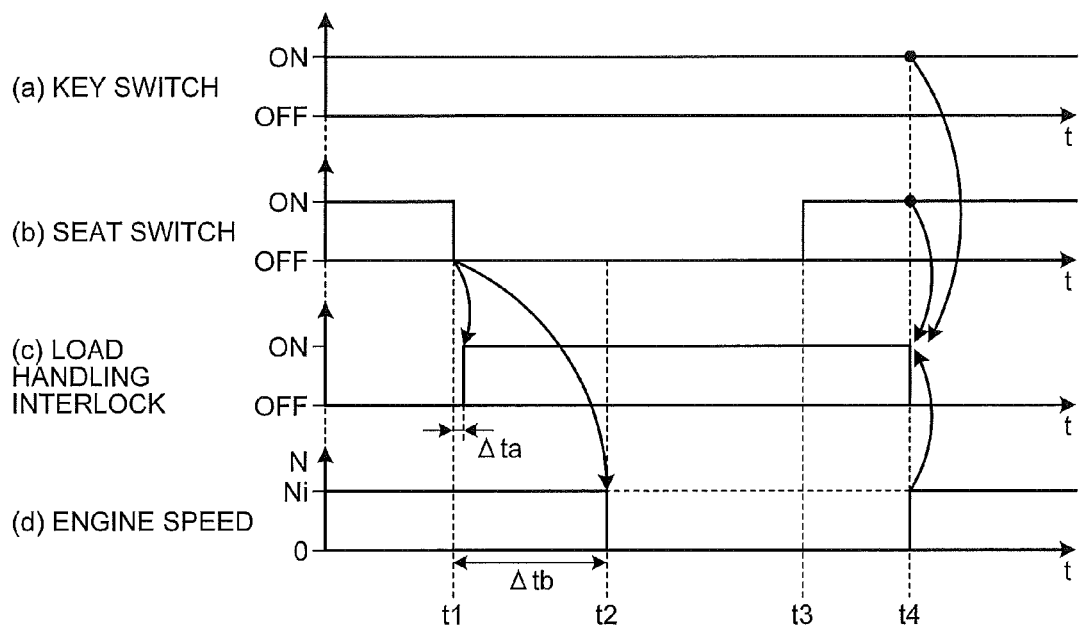
FIG. 4 is a time chart illustrating an example of a lock start and a lock release of the load handling interlock mechanism.

Here, referring to the time chart illustrated in FIG. 4, a start process and a release process of a concrete load handling interlock will be described. Note that, FIG. 4 illustrates a case in which the engine speed becomes over a predetermined engine speed, for example, 10 rpm. In FIG. 4, first, it is assumed that the key switch 9 is under the ON state, the seat switch 12 is under the ON (seating) state, the load handling interlock is under the release (OFF) state, the engine speed N is under the idle state (for example, the idle revolution per minute Ni=700 rpm). After that, at the time point t1, when the operator leaves the seat, the seat switch 12 is brought into the OFF state, and the load handling interlock is brought into the locked state after the predetermined time $\Delta ta$, for example, 3 seconds, elapses. On the other hand, when the seat switch 12 is brought into the OFF state at the time point t1, for example, by the auto idle stop mechanism, the engine is brought into the stop state at the time point t2 after a predetermined time $\Delta tb$, for example, 3 minutes, elapses. With this, the locked state of the load handling interlock is maintained. As a result, even when the key switch 9 is under the ON state, the engine 3 is brought into the engine stop state so that the fuel consumption can be improved. Moreover, when the load handling interlock is brought into the locked state, an unexpected ascending or descending motion of the fork which is the work device, or a tilting motion of the same, can be prevented.

After that, at the time point t3, for example, another operator takes a seat so that the seat switch 12 is brought into the ON state. Here, conventionally, at the time point t3, the key switch 9 is under the ON state, and the seat switch 12 is under the ON state, so that the locked state of the load handling interlock is released. However, in this embodiment, the locked state of the load handling interlock is not released because the additional condition that the engine speed is the predetermined engine speed (10 rpm) or more is not satisfied.

After that, at the time point t4, the engine is restarted, and the engine speed N becomes the idle revolution per minute Ni, so that the three conditions, i.e., the key switch 9 is under the ON state, the seat switch 12 is under the ON state, and the engine speed is the predetermined engine speed (10 rpm) or more, are satisfied so that the locked state of the load handling interlock is released.

The additional condition, i.e., the engine speed is the predetermined engine speed (10 rpm) or more, is introduced into the conditions for releasing the locked state of the load handling interlock, so that an operation of the work device operation lever 10 when the engine 3 is not rotated is determined not to correspond to an intention of the operator so as to maintain the locked state, on the other hand, an operation of the work device operation lever 10 when the engine 3 is rotated is determined to correspond to an intention of the operator so as to release the locked state.

Note that, instead of the condition that the engine speed is the predetermined engine speed or more, a condition that the key switch 9 is detected to be brought into the start position (ST) may be introduced. This is because, when the key switch 9 is brought into the start position (ST), the engine is restarted, and as a result, the engine speed becomes the predetermined engine speed or more.

REFERENCE SIGNS LIST

1 engine-powered forklift truck
2 car body
3 engine
4 work device pump
5 work device
6 fork
7 lift cylinder
8 tilt cylinder
9 key switch
10 work device operation lever
10a lift lever
10b tilt lever
11 seat
12 seat switch
13 controller
14 engine controller
17 lift operation valve
17a lift lock solenoid
18 tilt operation valve
18a tilt lock solenoid
23 starter
24 load handling interlock alarm lamp

The invention claimed is:
1. An engine-powered forklift truck including a work device which is hydraulically driven by an oil hydraulic pump whose driving source is an engine, comprising:

a load handling interlock mechanism configured to place a work device in a locked state by turning a key switch OFF or turning a seat switch OFF and a release control apparatus configured to, when the work device is in a locked state, determine whether the key switch is ON and the engine is rotated at an engine speed less than a predetermined engine speed, and
  (i) when the key switch is ON and the engine is rotated at an engine speed less than the predetermined engine speed, release the work device from the locked state on condition that the key switch is ON, the seat switch is ON, and the engine is subsequently rotated at an engine speed equal to or greater than the predetermined engine speed, and
  (ii) when the key switch is ON and the engine is not rotated at an engine speed less than the predetermined engine speed, release the work device from the locked state on condition that the key switch is ON and the seat switch is ON.

2. The engine-powered forklift truck according to claim 1, further comprising an idle stop mechanism which brings the engine into a state in which the engine is rotated at an engine speed which is less than the predetermined engine speed after a predetermined time elapses after the seat switch is switched to OFF.

3. The engine-powered forklift truck according to claim 1, wherein the work device is not placed in the locked state unless the seat switch is OFF for at least a predetermined amount of time.

4. The engine-powered forklift truck according to claim 1, wherein the engine is rotated at an engine speed less than the predetermined engine speed when a predetermined time period elapses after the seat switch turns from ON to OFF.

5. A load handling interlock release method for an engine-powered forklift truck including a work device which is hydraulically driven by an oil hydraulic pump whose driving source is an engine, comprising:
  placing a work device of the truck in a locked state by turning a key switch OFF or turning a seat switch OFF;
  when the engine is rotated at an engine speed less than the predetermined engine speed, releasing the work device from the locked state when the key switch is ON, the seat switch is ON, and the engine is subsequently rotated at an engine speed equal to or greater than a predetermined engine speed, and
  when the engine is not rotated at an engine speed less than the predetermined engine speed, releasing the work device from the locked state when the key switch is ON and the seat switch is ON.

* * * * *